(12) United States Patent
Randal

(10) Patent No.: US 10,633,598 B2
(45) Date of Patent: Apr. 28, 2020

(54) SYSTEM AND METHOD FOR REDUCTION OF THE TOTAL ACID NUMBER IN CRUDE OIL

(71) Applicant: Amperage Energy Inc., Cochrane (CA)

(72) Inventor: Chad Allen Randal, Cochrane (CA)

(73) Assignee: Amperage Energy Inc., Cochrane, AB (CA)

( * ) Notice: Subject to any disclaimer, the term of this patent is extended or adjusted under 35 U.S.C. 154(b) by 0 days.

(21) Appl. No.: 16/059,209

(22) Filed: Aug. 9, 2018

(65) Prior Publication Data

US 2019/0048268 A1 Feb. 14, 2019

Related U.S. Application Data

(60) Provisional application No. 62/543,633, filed on Aug. 10, 2017.

(51) Int. Cl.

| | | |
|---|---|---|
| *C10G 19/02* | (2006.01) | |
| *B05B 9/03* | (2006.01) | |
| *B01D 1/20* | (2006.01) | |
| *C10G 29/06* | (2006.01) | |
| *C10G 31/08* | (2006.01) | |
| *B01D 1/16* | (2006.01) | |

(52) U.S. Cl.
CPC .............. *C10G 19/02* (2013.01); *B01D 1/16* (2013.01); *B01D 1/20* (2013.01); *B05B 9/03* (2013.01); *C10G 29/06* (2013.01); *C10G 31/08* (2013.01); *C10G 2300/1033* (2013.01); *C10G 2300/203* (2013.01)

(58) Field of Classification Search
CPC ...... C10G 19/00–04; B01D 1/16; B01D 1/20; B01F 5/18; B01F 5/20; B05B 9/00; B05B 9/03
See application file for complete search history.

(56) References Cited

U.S. PATENT DOCUMENTS

| | | | |
|---|---|---|---|
| 5,858,212 A * | 1/1999 | Darcy | C10G 19/02 |
| | | | 208/208 R |
| 2008/0217211 A1 | 9/2008 | Chornet et al. | |
| 2008/0314796 A1 | 12/2008 | Chornet et al. | |
| 2015/0060333 A1 | 3/2015 | Chornet et al. | |
| 2015/0065766 A1 | 3/2015 | Dehkissia et al. | |
| 2015/0144535 A1 * | 5/2015 | Contreras Carvallo | ................. |
| | | | C10G 31/08 |
| | | | 208/390 |
| 2018/0201845 A1 * | 7/2018 | Li | C10G 19/02 |

* cited by examiner

*Primary Examiner* — Renee Robinson
(74) *Attorney, Agent, or Firm* — Cesari and McKenna, LLP

(57) ABSTRACT

The systems and methods reduce the total acid number (TAN) in crude oil. The crude oil, that includes naphthenic acid, is mixed with at least a caustic solution (e.g., sodium hydroxide) to produce a mixture. After mixing, the mixture is pumped to an atomizing tank. The mixture is spray-atomized in the mixing tank to produce a condensed liquid state of the crude oil that settles at the bottom of the atomizer tank and to produce minute droplets (e.g. mist, fog or the like) of the caustic. The minute droplets interact with and neutralize the naphthenic acid in the condensed liquid state of the crude oil for a predefined period of time. As a result, the resulting crude oil in the bottom of the atomizer tank has a reduced TAN and includes salt water. Additionally, the resulting crude oil has a water concentration that does not exceed 0.5%.

20 Claims, 4 Drawing Sheets

_US 10,633,598 B2_

SYSTEM AND METHOD FOR REDUCTION OF THE TOTAL ACID NUMBER IN CRUDE OIL

CROSS-REFERENCE TO RELATED APPLICATIONS

The present application claims the benefit of U.S. Provisional Patent Application Ser. No. 62/543,633, which was filed on Aug. 10, 2017, by Chad Allen Randal for SYSTEM AND METHOD FOR REDUCTION OF TOTAL ACID NUMBER IN CRUDE OIL, which is hereby incorporated by reference.

BACKGROUND

Technical Field

This application relates generally to systems and methods used for reduction of the total acid number in crude oil.

Background Information

Crude oil often has a high total acid number (TAN) that is corrosive and may damage equipment used in oil and gas refining processes. Further, various transportation rules and guidelines may require that the water concentration of crude oil not exceed certain levels, such as 0.5%.

Thus, there is a continued need in the industry for systems and methods to reduce the TAN in crude oils that are simple, fast, and efficient, while also ensuring that the water concentration of the crude oil does not exceed 0.5%.

SUMMARY

The systems and methods reduce the total acid number (TAN) in crude oil. The crude oil, that includes naphthenic acid, is mixed with a caustic solution to produce a mixture. In an embodiment, the caustic solution includes a specific caustic, such as sodium hydroxide, and water. In a further embodiment, a toluene mixture or an isopropylene mixture (i.e., a dispersant) may be added. In a further embodiment, a condensate (i.e., dilbit with a concentration of 20% to 60%) and/or synthetic crude (i.e., synbit) may be added to the mixture of the crude oil and the caustic solution, or to the mixture of the crude oil, caustic solution, and the dispersant.

After the mixing, the mixture is pumped by a pump to an atomizing tank. The mixture is spray-atomized in the mixing tank to produce a condensed liquid state of the crude oil that settles at the bottom of the atomizer tank and minute droplets (e.g. mist, fog or the like) of the caustic. The minute droplets interact with and neutralize the naphthenic acid in the condensed liquid state of the crude oil for a predefined period of time. As a result, the resulting crude oil in the bottom of the atomizer tank has a reduced TAN and includes salt water. Additionally, the resulting crude oil has a water concentration that does not exceed 0.5%.

BRIEF DESCRIPTION OF THE DRAWINGS

The description below refers to the accompanying drawings, of which.

DETAILED DESCRIPTION OF AN ILLUSTRATIVE EMBODIMENT

Figure 1A:
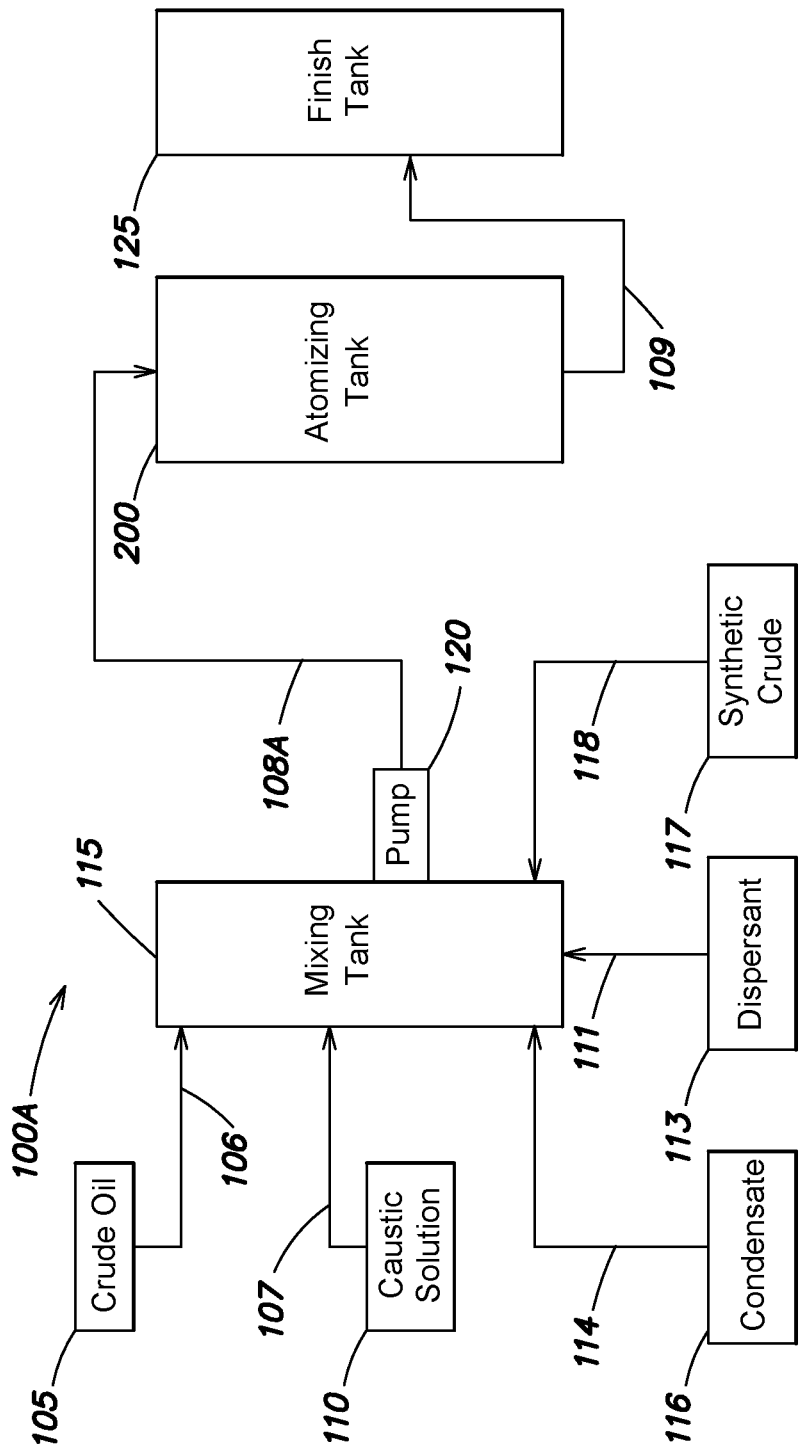
FIGS. 1A and 1B are overviews of the systems and methods.
Figure 1B:
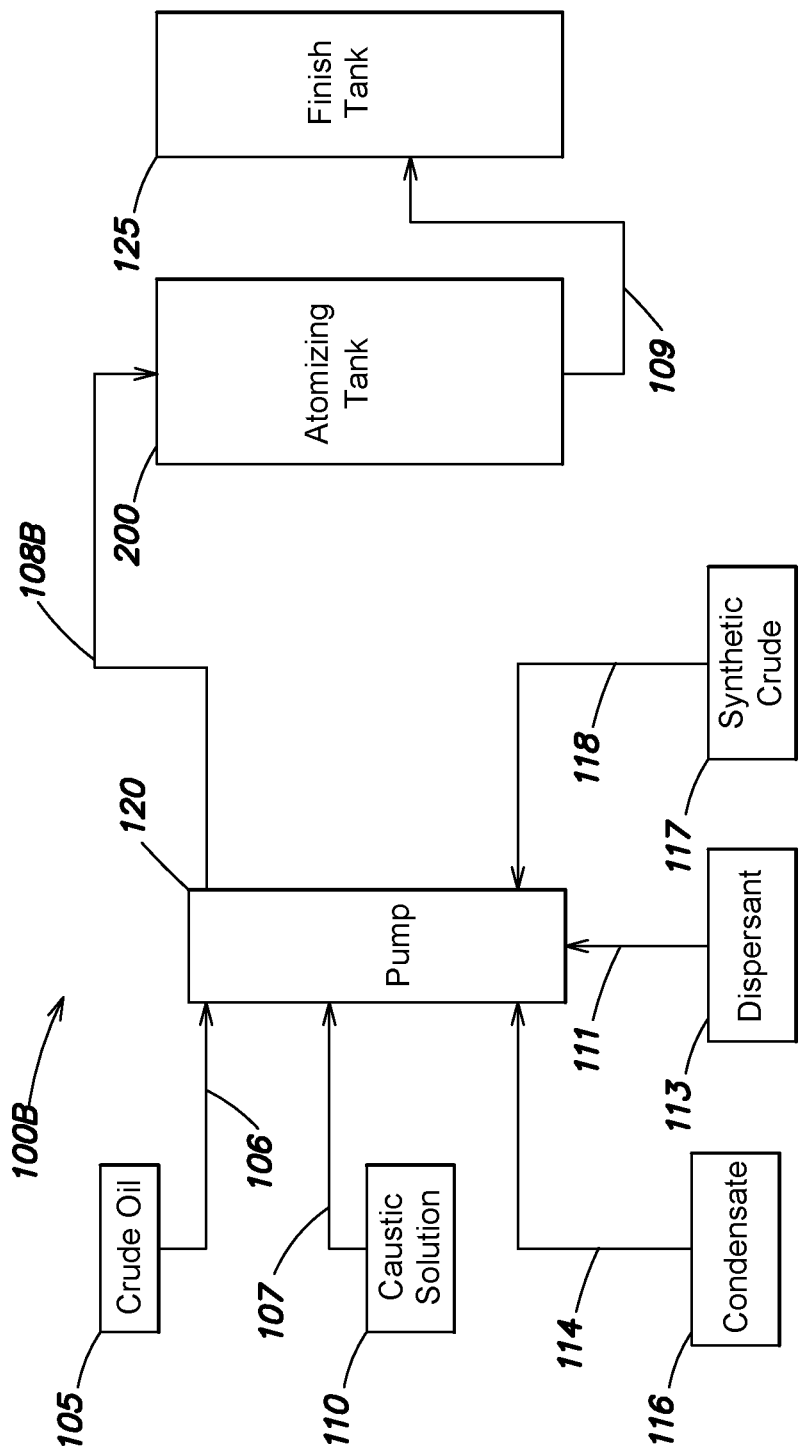

Referring to FIGS. 1A and 1B, systems 100A and 100B are respectively provided for reducing the total acid number (hereinafter "TAN") in crude oil 105 (i.e., pipeline spec oil) that includes naphthenic acid. For example the crude oil may be pre-diluted Bitumen or post-diluted Bitumen. Preferably, the crude oil 105, prior to mixing as described below, has a TAN of between 1.0 and 4.5. The crude oil 105 may be transported to mixing tank 115 utilizing one or more pipes 106 as depicted in FIG. 1A. In addition, a caustic solution 110 may be transported to the mixing tank 115, utilizing one or more pipes 107, to mix with the crude oil 105 as depicted in FIG. 1A. The caustic solution 110 comprises a caustic, such as sodium hydroxide, and water. Preferably, the caustic solution 110 has a maximum concentration of 50%, meaning that the solution is 50% pure caustic (e.g., sodium hydroxide) and 50% water. Further, the caustic solution 110 is preferably above 20° C. Although reference is made to utilizing sodium hydroxide as the caustic, it is expressly contemplated that any of a variety of caustics may be utilized.

In an embodiment, a dispersant 113, such as a toluene mixture or an isopropylene mixture may be added utilizing one or more pipes 111, to mix with the crude oil 105 and the caustic solution 110 in the mixing tank 115 as depicted in FIG. 1A. For example, the dispersant 113 may be a mixture that contains sodium hydroxide and toluene or sodium hydroxide and isopropylene. In addition or alternatively, a condensate 116 (i.e., dilbit with a concentration of 20% to 60%) may be added to the mixing tank 115 utilizing one or more pipes 114 as depicted in FIG. 1A. In addition or alternatively, synthetic crude 117 (i.e., synbit) may be added to the mixing tank 115 utilizing one or more pipes 118 as depicted in FIG. 1A.

Preferably, the amount of the caustic solution 110 added to the mixing tank 115 is between 500 parts per million (ppm) and 4,000 ppm. However, it is expressly contemplated that other amounts of the caustic solution 110 may be added to the mixing tank 115 to mix with the crude oil 105. The amount of the caustic solution 110 added to the mixing tank 115, to mix with the crude oil 105, may be based on the desired reduction of the TAN in the crude oil 105. For example, if the TAN of the crude oil 105 is at a high value, such as 4.5, than a greater amount of caustic solution 110 may be added to the mixing tank 115 to lower the TAN to a value between 0 and 1.0. However, if the TAN of the crude oil 105 is at a lower value, such as 2.0, than a lesser amount of caustic solution 110 may be added to the mixing tank 115 to lower the TAN to a value between 0 and 1.0. Therefore, as more caustic solution 110 is added to the mix with the crude oil 105, the TAN of the crude oil 105 can be reduced by a larger amount.

Although FIG. 1A depicts the crude oil 105, the caustic solution 110, the dispersant 113, the condensate 116, and the synthetic crude 117 being mixed in the mixing tank 115, is it expressly contemplated that the crude oil 105, the caustic solution 110, the dispersant 113, the condensate 116, and the synthetic crude 117 may mix in a common receiving pipe as depicted in FIG. 1B. Specifically, the one or more pipes 106, the one or more pipes 107, the one or more pipes 111, the one or more pipes 114, and the one or more pipes 118 may converge at a common pipe 108B, where the crude oil 105, the caustic solution 110, the dispersant 113, the condensate 116, and the synthetic crude 117 mix together.

For example, the crude oil 105 and the caustic solution 110 may be provided to the suction portion of a pump 120 utilizing pipes 106 and 107, while the dispersant 113, the condensate 116, and the synthetic crude 117 may be provided to the discharge portion of the pump 120 utilizing pipes 114, 111, and 118. Alternatively, all the components (e.g., the crude oil 105, the caustic solution 110, the dispersant 113, the condensate 116, and the synthetic crude 117) may be provided to the suction portion or discharge portion of the pump 120. It is expressly contemplated that any combination of the components may be provided to the suction portion and/or the discharge portion of the pump 120.

Mixture 120, which is a mixture of at least the crude oil 105 and the caustic solution 110, is output from the mixing tank 115 as depicted in FIG. 1A and output from the common pipe 108B as depicted in FIG. 1B. For example, the mixture 120 may include the crude oil 105 and the caustic solution 110. In a further embodiment, the mixture 120 may include the crude oil 105 and the caustic solution 110, and additionally one or more of the dispersant 113, the condensate 116, and the synthetic crude 117. Pump 120 provides pressure to transport the mixture 120, through the one or more pipes 108A, from the mixing tank 115 to atomizing tank 200 for atomization as depicted in FIG. 1A. Alternatively, pump 120 provides pressure to transport mixture 120 from the common pipe 108B to the atomizing tank 200 for atomization as depicted in FIG. 1B. The pressure provided by the pump 120 may be up to 150 psi. The pump 120 may be part of the mixing tank 115 or coupled to the mixing tank 115 as shown in FIG. 1A. Alternatively, the pump 120 may be provided at an inlet of common pipe 108B as shown in FIG. 1B.

Figure 2:
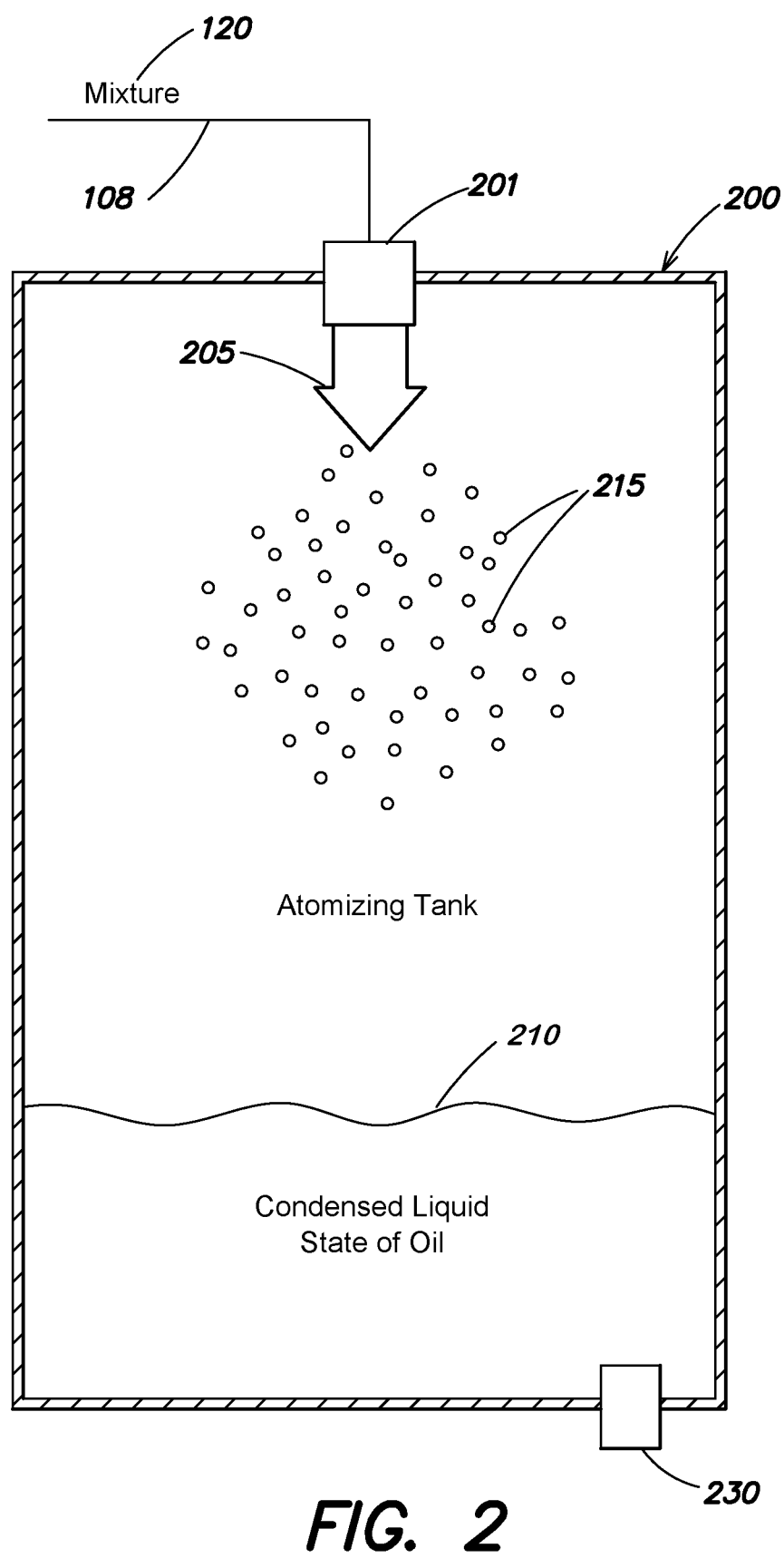
FIG. 2 is detailed view of an atomizer tank of an illustrative embodiment.

FIG. 2 is a more detailed depiction of atomizer tank 200. Illustratively, the atomizing tank 200 is maintained at zero atmosphere. The mixture 120 is pumped by pump 120 through an inlet 201 to a device 205 attached to the atomizing tank 200. The device 205 spray-atomizes the mixture 120 into the interior of the atomizer tank 200 to produce a condensed liquid state of the crude oil 210 that settles at the bottom of the atomizer tank 200 and also produce minute droplets 215 (e.g. mist, fog or the like) of the caustic. The minute droplets 215 fall on the condensed liquid state of the crude oil 210 that settles at the bottom of the atomizer tank 200.

Specifically, the droplets 215 come into aqueous contact with the naphthenic acid in the condensed liquid state of the crude oil 210 to neutralize the naphthenic acid in the condensed liquid state of the crude oil 210. The droplets 215 may be allowed to interact with the naphthenic acid for a predefined amount of time, for example, 15 minutes to 40 minutes. After the predefined amount of time has elapsed and the naphthenic acid have been neutralized, the resulting crude oil has a lower TAN (e.g., 0-1.0). In addition, and as a byproduct of the neutralization of the naphthenic acid, the resulting crude oil includes salt water. Further, the resulting crude oil has a water concentration that does not exceed 0.5%. Advantageously, the resulting crude oil is less corrosive on pipes and equipment than the original crude oil that includes naphthenic acid.

If it is desired to reduce the TAN of the resulting crude oil even further, additional mixture may be spray-atomized in the atomizing tank as described above, where the additional mixture includes more caustic solution than the original mixture.

The resulting crude oil, with the lower TAN and salt water, may be output from an outlet 230 at the bottom of the atomizing tank 200, as depicted in FIG. 2, to a finish tank 125 utilizing one or more pipes 109 as depicted in FIGS. 1A and 1B. Alternatively, the resulting crude oil may be output directly from the bottom of the atomizing tank 200 to a refinery (not shown) utilizing the one or more pipes 109.

Figure 3:
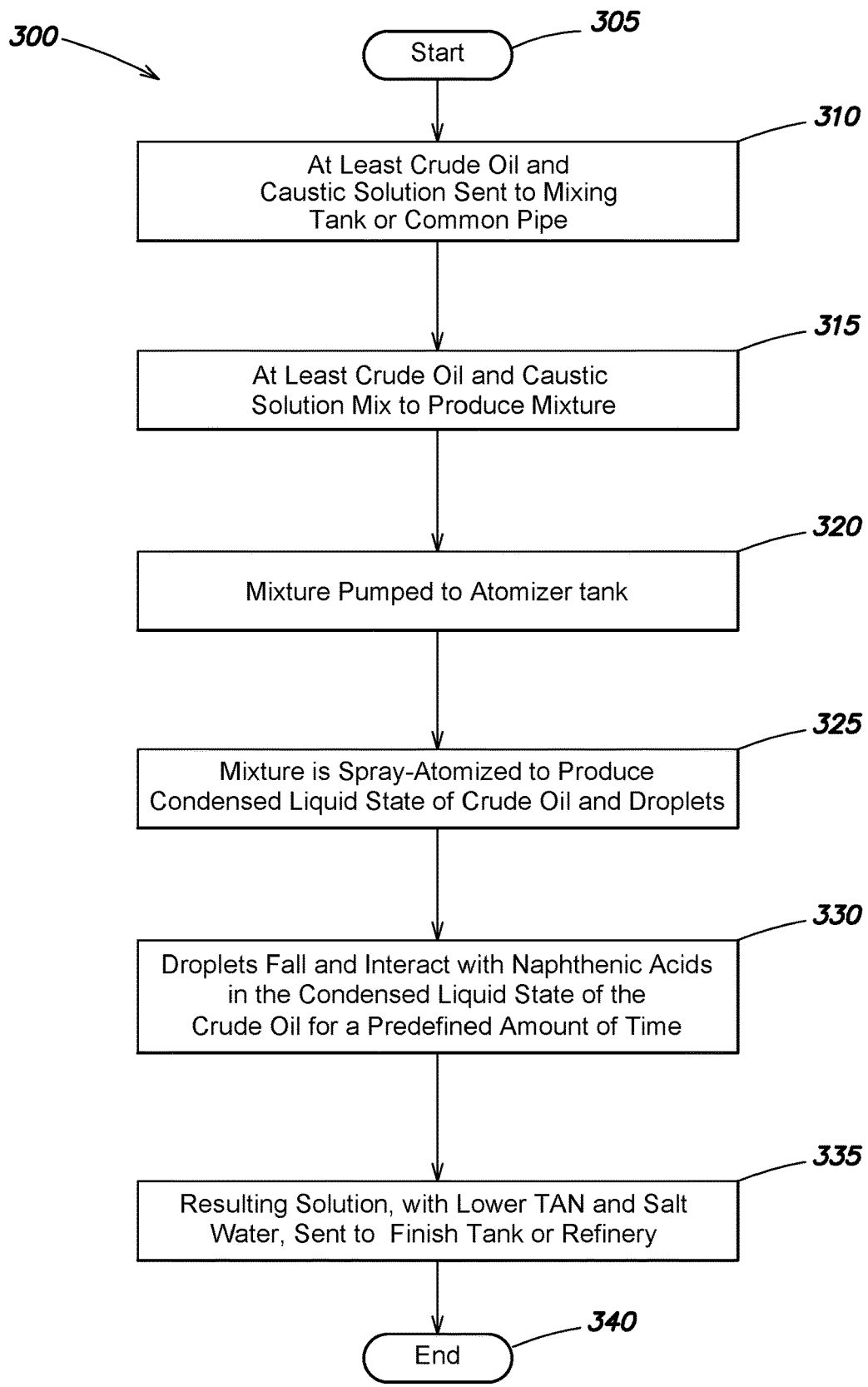
FIG. 3 is an example flow chart for the operation of the systems and method of FIGS. 1A and 1B.

FIG. 3 is an example flow chart of the operation of the system and method for reducing the TAN in crude oil. The procedure 300 starts at step 305 and continues to step 310 where at least the crude oil 105, that includes naphthenic acid, and a caustic solution 110 are sent to a mixing tank 115 as depicted in FIG. 1A or at a common pipe 108B as depicted in FIG. 1B. Specifically, the crude oil 105 may be sent to the mixing tank 115 or the common pipe 108B utilizing one or more pipes 106. In addition, the caustic solution 110 may be sent to the mixing tank 115 or the common pipe 108B utilizing one or more pipes 107. The caustic solution preferably has a maximum concentration of 50% and is at approximately 20° C. In an embodiment, the caustic is sodium hydroxide, although it is expressly contemplated that any of a variety of caustics may be utilized.

In a further embodiment, a dispersant 113, such as a toluene mixture or an isopropylene mixture may be added utilizing one or more pipes 111, to mix with the crude oil 105 and caustic solution 110 in the mixing tank 115 or the common pipe 108B. For example, the dispersant 113 may be a mixture that contains sodium hydroxide and toluene or sodium hydroxide and isopropylene. In addition or alternatively, a condensate 116 (i.e., dilbit with a concentration of 20% to 60%) may be added to the mixing tank 115 or the common pipe 108B utilizing one or more pipes 114. In addition or alternatively, synthetic crude 117 (i.e., synbit) may be added to the mixing tank 115 or the common pipe 108B utilizing one or more pipes 118.

The procedure continues to step 315 where at least the crude oil 105 and caustic solution 110 mix together in the mixing tank 115 or the common pipe 108B to produce a mixture. The procedure continues to step 320 and the mixture is pumped to atomizer tank 200. In an embodiment, pump 120 provides pressure to transport the mixture 120, through use of the one or more pipes 108A, to atomizing tank 200 for atomization when the mixing tank 115 is utilized as depicted in FIG. 1A. Alternatively, pump 120 may be located at an inlet of the common pipe 108B to provide pressure to transport the mixture 120 from the common pipe 108B to the atomizing tank 200 for atomization when the at least the crude oil 105 and the caustic solution 110 are mixed in the common pipe 108B as depicted in FIG. 1B. The pressure provided by the pump 120 may up to 150 psi.

The procedure continues to step 325 and the mixture is spray-atomized. Illustratively, the atomizing tank 200 is maintained at zero atmosphere. The mixture 120 is pumped by pump 120 through an inlet 201 to a device 205 attached to the atomizing tank 200. Specifically, the device 205 spray-atomizes the mixture 120 into the interior of the atomizer tank 200 to produce a condensed liquid state of the crude oil 210 and minute droplets 215 (e.g. mist, fog or the like) of the caustic.

The procedure continues to step 330 and the droplets 215 are allowed to fall and interact with the naphthenic acid in the condensed liquid state of the crude oil for predefined amount of time in the atomizer tank. Specifically, the droplets 215 come into aqueous contact with the naphthenic acid in the condensed liquid state of the crude oil 210 to neutralize the naphthenic acid. After the predefined amount of time has elapsed and the naphthenic acid have been neutralized, the resulting crude oil has a lower TAN (e.g., 0-1.0). In addition, and as a byproduct of the neutralization of the naphthenic acid, the resulting crude oil includes salt water. Further, the resulting crude oil has a water concentration that does not exceed 0.5%.

The procedure continues to step 335 and the resulting crude oil is sent to a finish tank or a refinery. Specifically, the resulting crude oil, with the lower TAN and salt water, may be output from an outlet 230 at the bottom of the atomizing tank 200 to a finish tank 125 utilizing one or more pipes 109 or may be sent directly to refinery utilizing the one or more pipes 109. The procedure ends at step 340.

Advantageously, the resulting crude oil is less corrosive on pipes and equipment than the original crude oil and also has a water concentration that does not exceed 0.5%.

The foregoing description has been directed to specific embodiments. It will be apparent, however, that other variations and modifications may be made to the described embodiments, with the attainment of some or all of their advantages. For example, other embodiments of the systems and methods may include additional tanks, pipes, subsystem etc. Further, and although reference is made to reducing the TAN in crude oil, it is expressly contemplated that the systems and methods as described herein may be utilized to reduce the TAN in any of a variety of substances.

What is claimed is:

1. A system, comprising:
a pipe or a mixing tank configured to mix at least a crude oil, having naphthenic acid, with a caustic solution to produce a mixture;
an atomizing tank configured to spray-atomize the mixture, wherein the spray-atomizing produces a condensed liquid state of the crude oil that settles at the bottom of the atomizer tank and droplets; and
a finish tank, that after a predetermined time and after the droplets have neutralized the naphthenic acid, receives a resulting crude oil that includes salt water with a reduced total acid number.

2. The system of claim 1, further comprising:
the pipe or the mixing tank further configured to mix the at least the crude oil and the caustic solution with a dispersant to produce the mixture.

3. The system of claim 2, wherein the dispersant includes at least one of a toluene mixture or an isopropylene mixture.

4. The system of claim 3, wherein the toluene mixture includes sodium hydroxide and toluene and wherein the isopropylene mixture includes sodium hydroxide and isopropylene.

5. The system of claim 1, wherein the caustic solution includes sodium hydroxide and water.

6. The system of claim 1, further comprising:
the pipe or the mixing tank further configured to mix the at least the crude oil and the caustic solution with a condensate.

7. The system of claim 6, wherein the condensate is dilbit including bitumen with a first concentration and the condensate with a second concentration from percent to 60 percent by volume.

8. The system of claim 1, further comprising:
the pipe or the mixing tank further configured to mix the at least the crude oil and the caustic solution with synthetic crude.

9. A system, comprising:
a pipe configured to:
mix crude oil, having naphthenic acid, with a caustic solution, and
mix the crude oil and the caustic solution with at least one of a dispersant, a condensate, and synthetic crude to produce a mixture;
an atomizing tank configured to spray-atomize the mixture, wherein the spray-atomizing produces a condensed liquid state of the crude oil that settles at the bottom of the atomizer tank and droplets; and
a finish tank, that after a predetermined time and after the droplets have neutralized the naphthenic acid, receives a resulting crude oil that includes salt water with a reduced total acid number.

10. The system of claim 9, wherein the dispersant is at least one of a toluene mixture or an isopropylene mixture.

11. The system of claim 9, wherein the condensate is a dilbit including bitumen with a first concentration and the condensate with a second concentration from 20 percent to 60 percent by volume.

12. The system of claim 9, wherein the caustic solution includes sodium hydroxide and water.

13. A method, comprising:
mixing, in a pipe or mixing tank, at least a crude oil, having naphthenic acid, with a caustic solution to produce a mixture;
spray-atomizing the mixture in an atomizing tank to produce a condensed liquid state of the crude oil that settles at the bottom of the atomizer tank and droplets; and
receiving, at a finish tank after a predetermined time and after the droplets have neutralized the naphthenic acid, a resulting crude oil that includes salt water with a reduced total acid number.

14. The method of claim 13, further comprising mixing the at least the crude oil and the caustic solution with a dispersant to produce the mixture.

15. The method of claim 14, wherein the dispersant includes at least one of a toluene mixture or an isopropylene mixture.

16. The method of claim 15, wherein the toluene mixture includes sodium hydroxide and toluene and wherein the isopropylene mixture includes sodium hydroxide and isopropylene.

17. The method of claim 13, wherein the caustic solution includes sodium hydroxide and water.

18. The method of claim 13, further comprising mixing the at least the crude oil and the caustic solution with a condensate.

19. The method of claim 18, wherein the condensate is dilbit including bitumen with a first concentration and the condensate with a second concentration from 20 percent to 60 percent by volume.

20. The method of claim 13, further comprising mixing the at least the crude oil and the caustic solution with a synthetic crude.

* * * * *

UNITED STATES PATENT AND TRADEMARK OFFICE
CERTIFICATE OF CORRECTION

PATENT NO. : 10,633,598 B2
APPLICATION NO. : 16/059209
DATED : April 28, 2020
INVENTOR(S) : Chad Allen Randal It is certified that error appears in the above-identified patent and that said Letters Patent is hereby corrected as shown below:

In the Claims

Column 5 Line 59:
Delete "condensate with a second concentration from percent to 60"
Insert --condensate with a second concentration from 20 percent to 60--

Signed and Sealed this
Nineteenth Day of September, 2023

Katherine Kelly Vidal
*Director of the United States Patent and Trademark Office*